United States Patent [19]
Belart

[11] Patent Number: 4,750,406
[45] Date of Patent: Jun. 14, 1988

[54] HYDRAULIC POWER BOOSTER

[75] Inventor: Juan Belart, Moerfelden-Walldorf, Fed. Rep. of Germany

[73] Assignee: Alfred Teves GmbH, Frankfurt am Main, Fed. Rep. of Germany

[21] Appl. No.: 924,796

[22] Filed: Oct. 30, 1986

[30] Foreign Application Priority Data

Nov. 30, 1985 [DE] Fed. Rep. of Germany ....... 3542418

[51] Int. Cl.$^4$ ............................................. F15B 9/10
[52] U.S. Cl. ..................................... 91/376 R; 91/32; 60/547.1
[58] Field of Search ............ 60/547.1; 91/368, 376 R, 91/32

[56] References Cited

U.S. PATENT DOCUMENTS 3,253,409  5/1966  Kellogg et al. .................... 60/547.1
3,625,113 12/1971  Suler ................................... 91/422
4,362,086 12/1982  Runkle ............................... 60/547.1

Primary Examiner—A. Michael Chambers
Attorney, Agent, or Firm—James B. Raden; Robert P. Seitter

[57] ABSTRACT

A hydraulic power booster, in particular for the actuation of a master cylinder in a brake system of an automotive vehicle is disclosed including a pressure fluid source, a valve assembly by means of which the pressure fluid is adapted to be introduced into a booster chamber in dependence upon an actuating force. An axially slidable stepped booster piston confines the booster chamber and is provided with two piston parts of different diameters which are movable axially relative to one another by a predetermined amount. To enable instantaneous pressure build-up in the working chambers of the master cylinder upon commencement of braking, an intermediate piston part is coupled to the primary piston of the master cylinder and is caused to move ahead of the actual booster piston part. Movement of the auxiliary piston part is achieved by passing the pressure fluid from the booster chamber through a channel in the booster piston part to an intermediate chamber wherein the fluid acts on the effective area of the auxiliary piston part. Discharge of the fluid through the channel is damped by a throttle and a nose portion of the auxiliary piston is slidably received in a blind bore in the booster piston providing damped auxiliary piston movement.

5 Claims, 1 Drawing Sheet

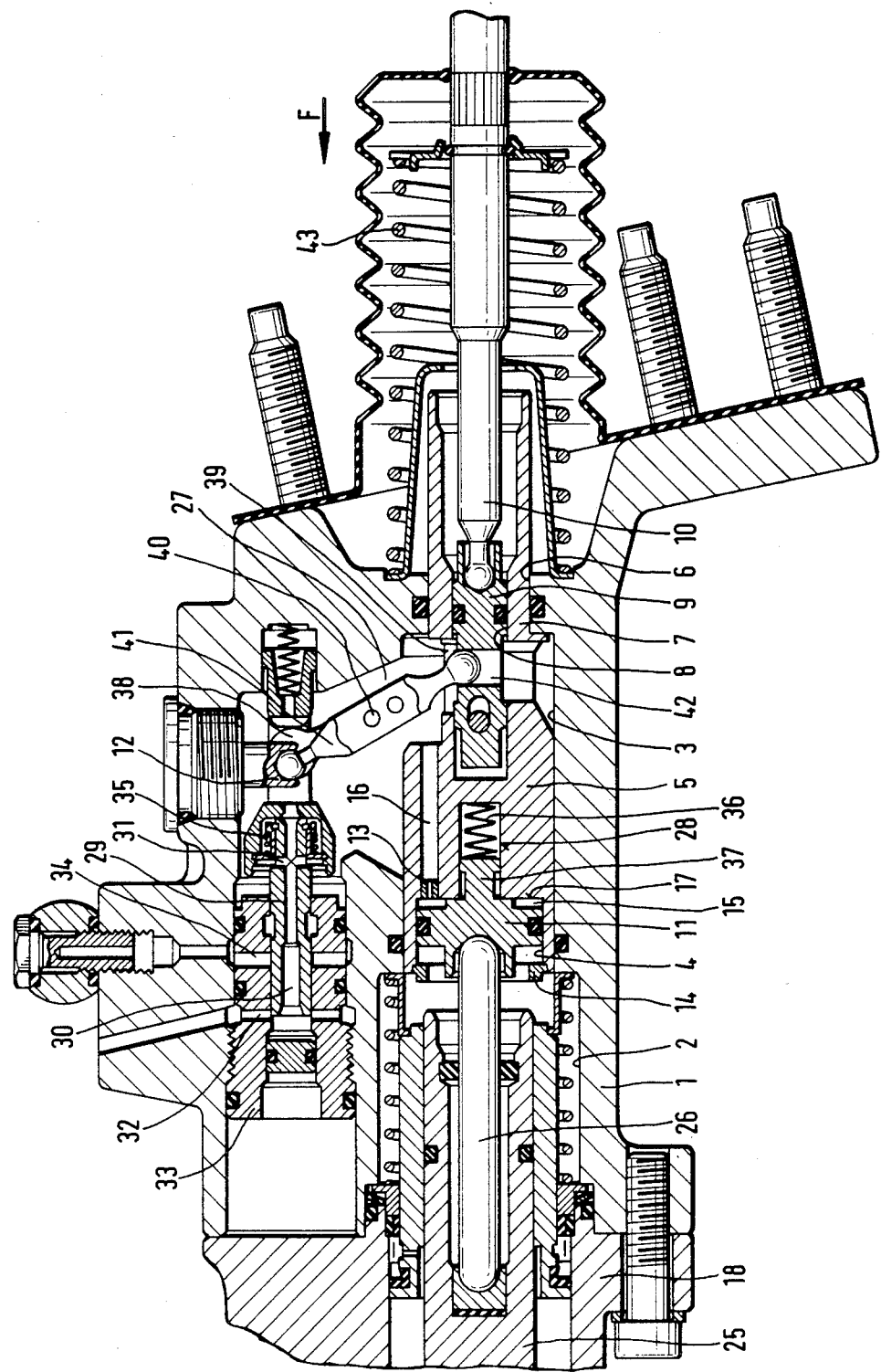

HYDRAULIC POWER BOOSTER

BACKGROUND OF THE INVENTION

The present invention relates to a hydraulic power booster, in particular for the actuation of master cylinders in brake systems of automotive vehicles. More particularly, the invention relates to a hydraulic booster of the type including a pressure fluid source, a valve assembly, by means of which hydraulic pressure is adapted to be introduced into a booster chamber in dependence upon an actuating force, and an axially slidable stepped booster piston which confines the booster chamber and which includes two interconnected piston parts of different diameters which are movable axially relative to one another by a predetermined amount. One such hydraulic booster is disclosed in the German patent application P No. 35 26 475.6.

A similar power booster is disclosed in German publication No. 33 15 730.8. In that power booster, the brake pedal-side end surface of the booster piston includes an extension terminating in an enlarged head. The head or extension is supported with axial play in an annular piston which is part of a piston rod that is connected with a brake pedal. The annular piston includes an axially outwardly extending annular collar which takes support on a shoulder of the housing in the brake's release position. When an actuating force is exerted on the brake pedal, the booster chamber is first isolated from an unpressurized supply reservoir by a brake valve. As the actuating force is increased, displacement of a control slide of the brake valve allows pressure fluid to flow out of a pressure source into the booster chamber, whereby the booster piston shifts and displaces in relation to the annular piston. At a certain pressure level in the booster chamber, the booster piston, after having overcome friction, will move together with the master cylinder piston in the actuating direction so that hydraulic pressure develops in the working chamber of the master cylinder. At a second predetermined pressure in the booster chamber of the hydraulic power booster the booster piston will have displaced in relation to the annular piston an amount equal to the axial play of the booster so that the head of the booster piston moves into abutment on the mating surface of the annular piston. This arrangement results in a relatively high level of noise and bouncing of the two pistons on one another.

SUMMARY OF THE INVENTION

The object of the present invention is to provide for a hydraulic power booster of the general type disclosed which prevents such heavy bouncing of the pistons and accompanying noise development during actuation of the booster.

It is a further object of the invention to provide for a reduction of lost travel by providing for swift closing of the central valves in the master cylinder operated by the booster.

These and other objects are achieved according to the invention in that the booster piston is provided with a bore at its end remote from the brake p;pedal in which bore an auxiliary piston is longitudinally slidably and sealingly incorporated. The auxiliary piston is in operative engagement with the piston of the master cylinder and with the booster piston defines a chamber which communicates with the booster chamber through a channel provided in the booster piston.

Preferably, a throttle is provided in the channel effecting delayed inflow and outflow of the pressure fluid into and out of the chamber so that the auxiliary piston moves ahead of the booster piston upon commencement of braking and thus displaces the pistons of the master cylinder such that the central valves of the master cylinder pistons will close quickly and isolate the working chambers of the master cylinder from their supply reservoir.

According to an important feature of the invention, the bore arranged at the end of the booster piston remote from the brake pedal is designed as a blind-end bore, while the booster piston is at this same end provided with a projection extending radially inwardly up to the area of the bore. The projection is preferably a stop ring or collar that is beaded, caulked or welded to the booster piston. The projection limits the stroke movement of the auxiliary piston and ensures that, during the actual braking operation, the booster piston and the auxiliary piston act like one single piston, and that in the brake's release position the auxiliary piston will always assume a defined alert position in relation to the booster piston.

Advantageously, the auxiliary piston is at its end facing the brake pedal provided with a pivot or a nose which plunges into the blind-end bore or longitudinal bore of the booster piston and produces a specific damping effect by either displacing pressure fluid out of the blind-end bore or sucking the fluid into the bore.

According to another feature of the invention, a compression spring is supported between the nose of the auxiliary piston and the bottom of the blind-end bore. The spring acts on the auxiliary piston in the actuating direction of the booster thereby assuring that the auxiliary piston is in constant abutment on the tappet of the master cylinder piston.

BRIEF DESCRIPTION OF THE DRAWING

The invention will be better understood after reading the following Detailed Description of the Invention in conjunction with the drawing which is a longitudinal cross section of a booster according to the invention showing details of construction.

DETAILED DESCRIPTION OF THE PREFERRED EMBODIMENT

In the drawing, reference numeral 1 designates a booster housing including a cylinder bore 2. A booster piston 5 is sealingly arranged in a smaller-diameter bore portion 3 of the cylinder bore 2, while the bore portion 6 accomodates sealingly a second piston part 7 of the booster piston 5.

The stepped piston part 7 is of tubular design and includes a through-bore which is radially stepped several times. Sealingly guided in a first bore portion 8 of the piston part 7 is a core piston 9 which is in connection with a push rod 10 that is connectible to a brake pedal, not shown. An auxiliary piston 11 is sealingly guided in a blind-end bore 4 in the end of the piston 5 that is remote from the brake pedal. A chamber 15 intermediate the auxiliary piston 11 and the end surface 17 of the booster piston 5 that is remote from the brake pedal is adapted to be acted upon directly by pressure fluid.

The booster housing 1 is fastened to a master cylinder housing 18 and includes a valve housing incorporating a brake valve having an axially slidable control slide 29.

The control slide 29 is substantially cylindrical and includes an axial through-bore 30 which, in the brake released position, provides a hydraulic communication with a (non-illustrated) unpressurized supply reservoir by way of a radial bore 32. Atmospheric pressure prevails in the booster chamber 27 in the brake released position of the hydraulic power booster. The control slide 29 includes a radial channel 31 which connects a housing channel 34 to the booster chamber 27 by way of an annular groove provided at the control slide 29 when the control slide 29 is displaced to connect a pressure fluid source to the booster chamber 27. The control slide 29 is biased by a compression spring 35 in the direction of brake release.

One end of a first lever 38 abuts an intermediate member on the right end of the control slide 29, as viewed in the drawing. The other end of the first lever 38 engages into a recess 39 in the piston part 7. Connected with the first lever 38 by way of a rotary joint 40 is a second lever 41 which has its upper end, as viewed in the drawing, stationarily supported in the housing 1 at support 12, while its lower end engages into a recess 42 in the core piston 9. The core piston 9 is axially displaceable relative to the piston part 7 in the direction of brake actuation.

The mode of operation of the hydraulic power booster will now be described in more detail beginning from the condition of brake release in which all movable parts assume the position shown in the drawing. The booster chamber 27 of the hydraulic power booster communicates via the control slide 29 with the unpressurized supply reservoir so that no hydraulic force is exerted on the booster piston 5 or on the master cylinder (not illustrated in the drawing) and the wheel brakes connected to the master cylinder are thus unpressurized and released.

When an actuating force F is applied on the brake pedal, the core piston 9 will displace to the left in opposition to the force of the compression spring 43, whereby the second lever 41 performs a clockwise tilting movement about the stationary point of support 12. Due to the seals which seal the booster piston 5 and the master cylinder piston 25 as well as the piston resetting springs, the lower end of the first lever 38 is first opposed by a relatively large resistance so that the upper end of the lever moves the control slide 29 of the brake valve to the left in the drawing. The control slide 29 thereby first causes closure of the radial bore 32 of the brake valve so that the booster chamber 27 is isolated from the unpressurized supply reservoir. As the force applied on the brake pedal is increased, continued displacement of the control slide 29 causes the housing channel 34 to be connected by way of the annular groove with the radial channel 31 of the control slide 29 so that pressure fluid flows out of the pressure source into the booster chamber 27 which fluid, on the one hand, pressurizes the core piston 9 with its relatively small effective surface and, on the other hand, acts upon the booster piston 5, whereby the booster piston is displaced to the left. Simultaneously, the pressure fluid enters through the channel 16 in the booster piston 5 into the chamber 15 between the auxiliary piston 11 and the end surface of the booster piston 5 and acts on the auxiliary piston 11 in the direction of actuation so that the auxiliary piston moves ahead of the booster piston 5 until the auxiliary piston 11 abuts on the collar 14 of the booster piston 5.

Due to the bipartite design of the booster piston 5, the pedal travel is shortened in an advantageous manner. By pressurization of the auxiliary piston of smaller diameter, the central valves provided in the master cylinder will be closed quickly, for example in the presence of a pressure of about 4 bar, so that pressure developes in the master cylinder at a very early point during actuation.

As can be seen in the drawing, a throttle 13 is provided in a the channel 16 so that, during brake release, the pressure fluid which entered into the chamber 15 during brake application is allowed to flow from the chamber 15 back into the booster chamber 27 in a throttled fashion only, thereby damping and bounce of the auxiliary piston 11 against the end surface 17 of the booster piston 5. The damping effect occurs even if the resetting springs which act in opposition to the direction of the arrow F on the pistons of the master cylinder are dimensioned comparatively strong.

Accomodated in a longitudinal bore 28 of the booster piston 5 is a compression spring 36 which acts upon the nose 37 of the auxiliary piston and which assures that the auxiliary piston 11 is always properly abutted on the tappet 26. Also, the movement of the nose 37 into and out of the bore 28 acts as a damping piston, since the bore 28 is also filled with pressure fluid.

What is claimed is:

1. A hydraulic power booster, in particular for the actuation of a master cylinder in a brake system of an automotive vehicle, comprising a pressure fluid source, a valve assembly by means of which said pressure fluid is adapted to be introduced into a booster chamber in dependence upon an actuating force, an axially slidable stepped booster piston which confines the booster chamber and which includes two interconnected piston parts of different diameters which are movable axially relative to one another by a predetermined amount, said booster piston including a bore at one end thereof in which an auxiliary piston is longitudinally slidable and sealingly disposed, said auxiliary piston being in operative engagement with a master cylinder piston of a master cylinder, a chamber between said auxiliary piston and said booster piston, said chamber connected with the booster chamber through a channel in the booster piston, said channel connecting the chamber and the booster chamber including a throttle, said throttle effecting delayed inflow and outflow of the pressure fluid into and out of the chamber to provide damping of the force of the auxiliary piston against the bore of the booster piston during brake release.

2. A hydraulic power booster as claimed in claim 1, wherein the bore arranged at the one end of the booster piston is a blind-end bore.

3. A hydraulic power booster as claimed in claim 1, wherein said one end of the booster piston includes a stop in the form of a projection extending radially inwardly up to the area of the bore.

4. A hydraulic power booster as claimed in claim 1, wherein the auxiliary piston includes a nose portion which plunges into said bore of the booster piston.

5. A hydraulic power booster as claimed in claim 4, wherein a compression spring is supported between the nose of the auxiliary piston and the bottom of the blind-end bore said spring acts upon the auxiliary piston in an actuating direction of the booster.

* * * * *